Patented July 6, 1943

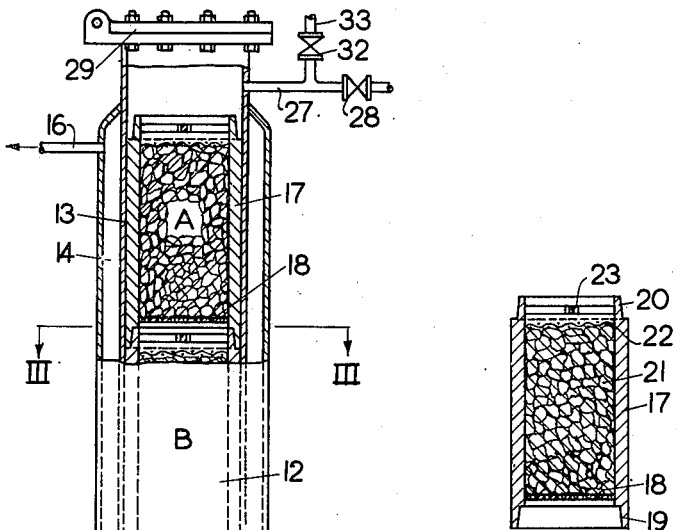
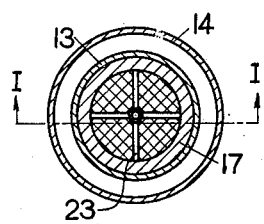
Fig. II
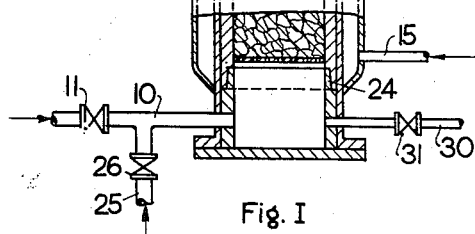
Fig. III
Fig. I
Inventor: Frank M. McMillan
By his Attorney:

2,323,830

UNITED STATES PATENT OFFICE 2,323,830

CATALYTIC CONVERSION PROCESS

Frank M. McMillan, Berkeley, Calif., assignor to Shell Development Company, San Francisco, Calif., a corporation of Delaware Application January 27, 1941, Serial No. 376,194

9 Claims. (Cl. 260—683.5)

The present invention relates to a process for the more efficient execution of reactions with solid catalysts. One preferred embodiment of the invention provides an improved process for the execution of hydrocarbon conversions, such, in particular, as the vapor phase isomerization of butane, with supported catalysts.

In effecting catalytic conversions with solid contact agents either one of two methods is generally employed. In such cases where the contact agent loses its activity relatively quickly and can be easily restored to its original activity (regenerative contact materials), it is the practice to employ the contact material in relatively short process or on-stream periods, during which the activity of the contact bed as a whole declines to a predetermined value, and to periodically restore the activity of the contact material between these process periods by a suitable treatment in situ. In other cases where the contact material loses its activity more or less slowly over a considerable period of time and is not particularly amenable to a simple treatment in situ to restore the activity, it is the practice to replace the contact material when its activity has fallen to a predetermined level. Neither of these methods utilizes the contact material to the fullest possible advantage. Prolonging the conversion period of the process to such an extent that the greater part of the catalyst bed is exhausted shortens the useful life of the catalyst and entails continuance of operation during a considerable period wherein the yield is considerably below the optimum. Furthermore, in the execution of conversion processes in the presence of stationary beds of solid catalytic materials the decline in catalytic activity of the catalyst takes place at differing rates throughout the catalyst bed during the course of the operation. Therefore, when the effectiveness of the catalyst bed as a whole has declined to the extent where desired yields of product are no longer attained, the catalyst bed is composed of catalytic material varying in degree of catalytic activity from a state of substantially complete exhaustion to one of but slight impairment. Subjecting the catalyst bed as a whole to a treatment directed to the restoration of the catalyst activity is not only costly but detrimental to the useful catalyst life of that part of the catalyst bed not in need of such drastic treatment.

The object of the present invention is to provide an improved process for the execution of catalytic conversions with fixed beds of solid catalyst whereby the solid contact material may be employed more advantageously, and the above difficulties may be substantially overcome. A further object of the invention is to provide an improved process especially adapted for the execution of catalytic conversion of hydrocarbons with regenerative contact materials. A still further object of the invention is to provide a process especially adapted for effecting catalytic conversions with catalysts containing a volatile or fugitive component. Objects of certain specific aspects of the invention are to provide an improved process for the isomerization of hydrocarbons such, in particular, as butane with supported aluminum chloride catalysts whereby the catalyst life is materially increased, the escape of catalyst from the reaction zone is prevented, and a new and more efficient guard-tube-effect is realized. Further objects and advantages of the process of the invention will be apparent from the following detailed description thereof.

According to the process of the invention, the catalyst, after its activity has declined during use to a predetermined level, is not subjected in toto to a treatment to restore the activity but is divided into portions which are then separately treated under optimum conditions to restore the activity. It has been found that catalytic reactions can be executed in the presence of solid catalytic materials with an efficiency as determined by yield and purity of product, catalyst life, catalyst saving, etc. substantially superior to that of processes disclosed heretofore by intermittently removing less active catalytic material from the catalyst bed as soon as the bed as a whole has fallen below the desired degree of activity, separately regenerating the less active portion outside of the reaction zone, separately reactivating the remaining part of the bed in situ, and returning the regenerated catalyst to the catalyst bed.

By "reactivation," as used throughout the specification and claims, is meant any treatment at normal or elevated temperature which may be advantageously applied to a partially spent catalyst in situ to restore its catalytic activity. Such reactivation may comprise the passage of suitable fluids through the catalyst bed in situ to remove undesirable material therefrom, deposit a catalytic component therein, or to chemically react with the catalyst or its contaminants. The material removed from the catalyst bed may comprise a spent catalytic component or a deposited material. The material removed may dissolve in the fluid as, for example, where a solvent is passed through the catalyst bed to dissolve deposited reaction products or the fluid may react with the material to be removed as, for example, where chlorine, hydrogen chloride, steam, oxygen or oxygen-containing gases such as air are passed through the catalyst bed to burn and/or entrain carbon or carbonaceous products therefrom. Materials which may be deposited in the catalyst bed during the reactivation comprise catalytic components. Thus, finely divided metals or metal compounds may be suspended in a suitable fluid and passed through the catalyst in situ or volatile compounds such, for example, as halogens, metal halides, metal carbonyls and the like, optionally diluted with inert gases, may be passed through the catalyst in situ.

By the term, "regeneration," as used throughout the specification and claims is meant the more drastic treatment accordeded a spent or substantially spent catalytic material comprising, for example, one or more of the following: (1) The removal of reaction products which are not amenable to removal by reactivation in situ; (2) the separate recovery of the individual components of the catalyst; (3) the separate restoration of one or more of the components to its original active state; and/or (4) the utilization of the separately recovered catalytic components to restore the active catalytic material.

The process of the invention may be employed in various processes with catalysts of different types. It is advantageous, for example, for the execution of hydrocarbon conversions with regenerative contact masses such as the various synthetic hydrosilicate catalysts and the supported metal oxide-type catalysts. In the treatment of hydrocarbons and hydrocarbon fractions with a catalyst comprising a porous support impregnated with a compound of a metal having hydrogenation-dehydrogenation properties, the process cycle is continued until the production rate has declined to a predetermined level. A portion of the less active catalyst is then removed and subjected to a regeneration treatment exterior to the reaction zone, for example, by treating with acid or by overburning, i. e. treating the catalyst at a somewhat higher temperature with a large excess of air or oxygen to reoxidize and reform the catalytic metal compound. The remaining catalyst is reactivated in situ, for instance, by conventional burning-off treatment. The regenerated catalyst is then re-introduced into the reaction zone, preferably at a point adjacent to the most active part of the catalyst bed.

The process of the invention is particularly advantageous for executing conversions with the aid of solid catalysts containing a more or less volatile or fugitive catalytic component. In this case the reactivation in situ may usually be effected by treating the partially spent catalyst with vapors of the volatile component, for example, vapors of a metal carbonyl, metal halide or the like. Particular catalysts of this type which may be most advantageously used in the present process and apparatus are supported aluminum chloride catalysts, such for example, as an adsorptive carrier impregnated with aluminum chloride. These catalysts are useful for many hydrocarbon conversions and especially for the vapor phase isomerization of saturated hydrocarbons such, in particular, as butane. When effecting reactions with such catalysts according to the process of the present invention, a less active part of the catalyst may be periodically withdrawn and regenerated. The remaining catalyst may be easily and effectively reactivated in situ by treatment with aluminum chloride vapors.

The reactivation of such catalysts in situ by the treatment with aluminum chloride vapors is quite unexpected. It has been found that aluminum chloride catalysts prepared by vapor phase impregnation of an absorptive carrier with aluminum chloride, though initially substantially saturated with respect to aluminum chloride vapor and though they have lost but a fraction of a percent of their aluminum chloride content during the conversion operations, will now, after use for a period of time in the process, adsorb an additional several percent of aluminum chloride when treated with aluminum chloride vapors. For instance, a catalyst which was saturated with respect to aluminum chloride at the start of the operation and which lost about one-half percent of its aluminum chloride content during the conversion operation will now adsorb an additional amount, for example, about 2%—3%, of aluminum chloride when aluminum chloride vapors are passed through it. It has been found that by such a reactivation treatment the catalyst may be brought to a state of activity substantially equal to and often surpassing its original activity. The useful life of the catalyst may thus be considerably prolonged by this method of reactivation. The effectiveness of this method of catalyst reactivation is illustrated by the following example:

*Example I*

A catalyst prepared by adsorbing aluminum chloride vapors by an adsorptive alumina to substantial saturation was used for 650 hours in the isomerization of normal butane, during which time the conversion to isobutane gradually declined from 65% to 17%. The partially deactivated catalyst was then treated at a temperature of about 220° C. with vapors of anhydrous aluminum chloride. The thus-treated catalyst was found to have taken up an additional amount of aluminum chloride (about 2%), whereas the aluminum chloride content of the fresh catalyst could not be appreciably increased by further vapor phase impregnation. When the thus-reactivated catalyst was again used in the isomerization of normal butane under comparable conditions, an initial conversion of 60% was attained and a conversion in excess of 45% was still attained after an additional 150 hours of operation.

Another method of reactivating these catalysts in situ, which may be applied but which is much less effective than the above-described treatment with aluminum chloride vapors, is to treat the catalyst for some time with a relatively high concentration of hydrogen chloride, preferably under pressure.

The less active material intermittently withdrawn from the reaction zone is subjected to an appropriate regeneration treatment such as mentioned above. When effecting reactions with the aid of supported aluminum chloride catalysts such as the above-described isomerization of normal butane, the regeneration may be effected most advantageously according to the method disclosed in copending application, Serial No. 322,208, filed March 4, 1940. In accordance with this method of regeneration the withdrawn catalyst is washed with aqueous alkali solution, for example, a 6N solution of sodium hydroxide, whereby the aluminum chloride is removed therefrom. The resulting support material substantially free of aluminum chloride is washed with water or an acidic solution to remove excess base and is then activated at an elevated temperature of, for example, about 300° C. This method permits the recovery of the support in a most active and adsorptive condition with a minimum loss due to disintegration, etc. The resulting regenerated support is then impregnated with aluminum chloride vapors to obtain an active isomerization catalyst.

The following example illustrates the effectiveness of the method of regenerating the spent aluminum chloride catalyst:

*Example II*

An aluminum chloride catalyst prepared by the vapor phase impregnation of an adsorbent alumina was used for 650 hours for the isomerization of n-butane, during which time its activity gradually decreased, the conversion falling from 66% to 30% in 275 hours, and finally to 17% after 650 hours. A portion of the spent catalyst which was least active and discolored due to contamination by organic material was treated with a solution of 6N sodium hydroxide for 18 hours. After draining off the alkali, the alumina was washed with water and then activated by heating at about 300° C. Ninety percent of the adsorptive alumina present in the original catalyst was recovered. The recovered alumina was slightly discolored, but when re-impregnated with aluminum chloride it produced a catalyst fully equal in activity to the original catalyst. When used in the isomerization of n-butane under comparable conditions it afforded an initial conversion of 65%, and a conversion of 30% after 350 hours of continuous use.

The duration of the conversion step before restoring the activity of the catalyst bed may vary considerably within the scope of the invention. The invention, however, makes possible and desirable the operation at more nearly optimum yields. The intermittent circulation of the catalyst caused by removal of catalyst from one part and return to another part of the catalyst bed furthermore provides improved distribution of catalytic material of varying degrees of catalytic activity in the reaction zone, thereby avoiding to a substantial degree the difficulties arising as a result of the tendency of the rate of reaction to vary throughout the length of the catalyst bed when operating continuously with a catalyst bed of constant degree of activity throughout.

The process of the invention may be effected in any suitable form of apparatus providing a reaction zone from which the less active catalyst can be periodically removed and the regenerated catalyst returned thereto. Apparatus particularly adapted for carrying out reactions in the presence of solid catalytic materials, according to the process of the invention, comprises a converter providing an elongated reaction zone containing a plurality of easily and separately removable catalyst cartridges positioned one above the other within the reaction zone. An apparatus of this type is shown in the attached drawing forming a part of this specification and wherein Figure I is an elevational view, partly in section, of a converter providing a reaction chamber containing a plurality of catalyst containers or cartridges; Figure II is a detail view showing in vertical section one of the catalyst containers shown in Figure I; and Figure III is a transverse sectional view taken on line III—III of Figure I.

Reacants obtained from any suitable source, and which may be preheated and otherwise pretreated by means not shown in the drawing, are passed through line 10 controlled by valve 11 into the lower part of converter 12. Converter 12 comprises a reaction chamber 13 provided with a heating and/or cooling jacket 14 for the maintenance of the desired temperature. Jacket 14 is provided with suitable connections 15 and 16 for the circulation of any suitable fluid heat carrier. A plurality of catalyst containers, A, B, C, D and E, are positioned one above the other within the reaction chamber 13. The catalyst containers comprise non-perforated metal sides 17, a perforated bottom, for example, a screen 18, and an open top. The top and bottom of the catalyst container are provided with suitable cooperating members, for example, flush step joints 19 and 20, permitting the formation of substantially vapor tight connection between adjoining containers. A screen 22 may, if desired, be positioned above the catalyst 21 within the container. Each container is preferably provided at its upper part with a supporting means 23, for example, two bars of metal rigidly fixed to the upper part of the container at right angles to one another, to which a member of a suitable lifting means may be hooked to enable the container to be withdrawn from and inserted into the reaction chamber. The length of each catalyst container may vary depending upon the nature of the particular conversion operation and the type of catalyst used. Also, although the drawing shows the use of five catalyst containers, it is to be understood that the invention is not limited to this number of containers, and a greater or lesser number may be used. The cross-sectional area of the catalyst containers is preferably such that intimate contact will be maintained between substantially the entire outer wall of the container 17 and the inner wall of the reaction chamber 13, thereby assuring a suitable heat transfer between the catalyst and the heat controlling medium in jacket 14. The lower part of the reaction chamber is provided with supporting means for the catalyst containers. The supporting means will preferably consist of a means, for example, a flush step joint 24, cooperating with joint 19 of the catalyst container in position E to form a substantially vapor tight connection therewith. The catalyst containers will divide reaction chamber 13 into a plurality of intercommunicating compartments through which the reactants are caused to flow. The converter is provided with an easily removable head, such as a hinged cover 29, to permit easy access to the reaction zone for the introduction and removal of the catalyst containers.

The apparatus described enables the efficient contacting of reactants and catalyst in a plurality of compartments, with facility of catalyst temperature control through the wall of the container and without danger of by-passing reactants about any of the compartments. The ease of handling of the individual containers facilitates the intermittent withdrawal of less active catalyst from the bed and enables the efficient treatment of separate portions of the catalyst bed. It furthermore enables the efficient distribution and intermittent re-distribution of the separate catalyst portions throughout the reaction zone. The described converter is particularly advantageous for the execution of reactions at elevated temperatures and high pressures in elongated beds since it allows certain difficulties such as slogging, catalyst caking, difficulty of catalyst removal, catalyst temperature control, etc., to be largely overcome.

The described apparatus is applicable to the execution of a variety of catalytic reactions. However, for the purpose of a more ready understanding thereof, its use will be described with reference to its application in the catalytic isomerization of butane. Butane, which has been preferably preheated to a temperature of, for example, from about 90° C. to about 150° C., is forced at a pressure of, for example, from about 150 to about 250 lbs. per sq. in., by means not shown in the drawing, through line 10 controlled by valve 11 into the lower part of converter 12. All or a part of the catalyst containers are filled with a suitable isomerization catalyst such, for instance, as an adsorptive alumina impregnated with aluminum chloride to substantial saturation by treatment with aluminum chloride vapors. Hydrogen chloride, preferably in the amount of from about 1% to about 25% of the charge, is introduced into line 10 through line 25 controlled by valve 26. A temperature control fluid, for example, water, oil, steam or the like is circulated through jacket 14 to maintain the desired temperature of, for example, from 90° C. to about 150° C., within the reaction zone. The reaction product containing isobutane leaves the reactor via line 27 and valve 28.

When the effectiveness of the catalyst bed as a whole has declined to the extent where desired yields are no longer obtained the operation is interrupted. The catalytic activity of the catalyst in containers A to E inclusive will be found to decrease progressively in that order.

The catalyst in containers which held positions A to D inclusive in the completed conversion operation are intermittently reactivated by treatment with aluminum chloride vapors. This phase of the operation is preferably effected in situ. All containers are, therefore, removed from the reaction chamber and containers which held positions A to D inclusive are reinserted into the reaction zone in the same relative position to one another; the container which held position D in the completed phase of the operation now occupying the lowest position, E. Anhydrous aluminum chloride vapors are introduced into the lower part of the reaction zone through line 30 controlled by valve 31 and passed upwardly through the containers, the contents of which will again attain their desired degree of activity. By closing valve 28 and opening valve 32 during the impregnation operation, excess aluminum chloride vapors are eliminated from the system through line 33. To prevent condensation of aluminum chloride vapors in the reaction zone, the reaction chamber is maintained at a temperature of, for example, from about 185° C. to about 300° C. during this reactivation operation. Lines 30 and 33 are preferably insulated.

Although the catalyst activity may be restored by reactivation in situ, the duration of the activity is somewhat shorter after each reactivation and the number of reactivations by this method is therefore limited by the attainment of a duration of activity below the desired length or by the complete exhaustion of the catalyst.

In the process of the invention the container in the bottom position is intermittently removed. Each of the remaining containers assumes the next lower position and the catalyst is reactivated in situ. When a container finally reaches and completes a conversion phase of the cycle, in position E, it is removed and the catalyst therein is subjected to a separate regenerative treatment exterior to the reaction zone. The contents of the container in position E, upon completion of a conversion phase of the cycle, is subjected to a suitable regeneration treatment, such as described above, to recover and regenerate the components of the catalyst. The regenerated catalyst is returned to the reaction chamber in position A above the remainder of the bed which has been reactivated in situ, and the conversion phase of the cycle is begun. The regenerated support may be placed in position A in the reaction zone and be impregnated with aluminum chloride therein simultaneously with the re-impregnation of the remainder of the catalyst bed. The passage of the aluminum chloride vapors through the containers in this case is continued until the topmost container containing the regenerated support has become substantially saturated with respect to aluminum chloride.

When utilizing as catalyst a material having an appreciable degree of solubility in the reactants or which has a relatively high vapor pressure, as for example, aluminum chloride, some of the catalyst will tend to pass out of the reaction zone, together with the reaction products, thereby causing serious trouble due to clogging of parts of apparatus, contamination of product, etc. By filling the container in position A with a suitable adsorbent, for example, the adsorbent alumina used as support for the aluminum chloride catalyst, it is possible to substantially completely avoid the loss of catalyst from the reaction zone. In a preferred method of carrying out the isomerization of butane in accordance with the invention the regenerated catalyst support is therefore inserted in position A after the rest of the catalyst bed has been reactivated by treatment with aluminum chloride vapors.

The amount of aluminum chloride upon an adsorbent carrier must exceed a well defined minimum to attain desirable effectiveness as an isomerization catalyst, for example, above about 8% for the activated alumina carrier used in the present illustrative example. Therefore, the regenerated support material may be placed in the reaction zone prior to the passage of the aluminum chloride vapors therethrough and the duration of the passage of the vapors controlled to allow the aluminum chloride content of container in position B to exceed this minimum, and the contents of container in position A to remain well below this minimum. In this way container A, though containing some aluminum chloride, will still function to prevent the escape of catalyst from the reaction zone. After completing a conversion phase of the cycle in position A the container will move to position B and be saturated with aluminum chloride prior to the next conversion step.

The following example is given to illustrate the effectiveness of the use of the adsorbent alumina in position A in preventing the escape of catalyst from the reaction zone.

*Example III*

8.4 liters of aluminum chloride catalyst prepared by the vapor phase impregnation of an adsorbent alumina was placed in cartridges in a suitable cylindrical reactor. A one-liter cartridge of activated alumina was placed in the reactor above the catalyst cartridges. The reactor was closed and heated to a temperature in the range of from 100° C. to 135° C. and maintained in this temperature range while normal butane vapors containing from 3 mol percent to 20 mol percent HCl were passed therethrough under a pressure in the range of from 175 to 250 pounds. 15,307 pounds of feed were passed through the reactor at the above conditions in a period of 2,281 hours of operation. At the termination of this operation, it was found that the loss in weight of the catalyst was almost equal to the gain in weight of the activated alumina, less than 0.7% of catalyst having been lost from the reactor.

It is seen that during the course of the successive operating cycles the catalyst moves downward in the reaction zone as its catalytic effectiveness declines, the exhausted catalyst being intermittently removed from the lowest part of the catalyst bed to be regenerated and again form the upper part of the bed. In one preferred modification of the invention particularly adapted for the vapor phase isomerization of hydrocarbons the lower section of the catalyst is used as a pretreating zone. To this object container in position E is filled with an adsorptive material which serves to remove entrained matter from the reactants and otherwise pretreat the reactants prior to their contacting the catalyst, thereby considerably prolonging the life of the catlyst and the length of each individual conversion step of the cycle. It has been found that the adsorbent material which has been in position A for a conversion period and which contains adsorbed aluminum chloride removed from the reaction products constitutes an ideal material for this purpose. Its particular advantage resides in the fact that it has been admirably conditioned for this purpose during the previous conversion step. It has given off all the moisture which a fresh batch of similar adsorbent would liberate at the operating conditions as a result of its displacement by the hydrogen chloride in the charge, and which moisture is detrimental to the life of the aluminum chloride catalyst. It furthermore is saturated with hydrogen chloride, thereby avoiding the difficulties occasioned at the start of each conversion step with fresh absorbent in the pretreater due to the removal of hydrogen chloride from the charge by the pretreating material. In this modification of the process of the invention, therefore, container in position A is shifted to position E at the end of each conversion step. In this method of operation, only the containers in positions B, C, and D are filled with catalytically effective material. At the termination of the conversion step, contents of container D, which now contains the least active catalyst, are subjected to the above-described treatment to recover and regenerate the adsorbent support whereupon it is moved to position A. The contents of containers E, B and C are subjected at the end of the conversion step to a reactivation treatment such as described above and will form the catalytic section of the catalyst bed in the subsequent conversion step. During continued operation comprising the successive cycles, each including a conversion step and a step of restoring the catalyst to the desired catalytic activity, the material comprising the catalyst bed will constantly move through the reaction zone along the following course: Beginning as absorbent in position A, it will move to position E. Upon completion of its function as pretreater it will move to position B and be impregnated with aluminum chloride. Thence it will move downwardly through the catalytic section of the reaction zone as its catalytic effectiveness decreases until it attains position D. After completing a conversion step in position B, it is treated to recover and regenerate the support material and is moved to position A to repeat the intermittent flow.

Although the invention has been described in its application to a process utilizing an upward flow through the converter, it is to be understood that the invention is not limited thereto and the reactants may, if desired, be passed downwardly through the converter.

The constant circulation of the catalyst in the isomerization process of the invention enabling the contacting of the reactants with catalyst of gradually increasing activity permits the attainment of uniform reaction rates throughout the reaction zone. This in addition to the novel method of reactivating the aluminum chloride catalyst by treatment with aluminum chloride vapors and the ease of catalyst handling permits the use of longer conversion periods of optimum conversion conditions. The constant circulation of the catalyst furthermore avoids difficulties such as fouling of the catalyst and clogging of the catalyst bed toward the outlet end of the reaction zone in operations wherein the product has a greater tendency to undergo side reactions than the charge material. These, in addition to the many advantages inherent in intermittent withdrawal of the least active part of the catalyst bed, its separate regeneration outside the catalyst zone and the reactivation of the remainder of the bed in situ, provide a process, the efficiency and economical advantages of which considerably exceed those of processes available heretofore for the execution of catalytic reactions in elongated beds of solid catalyst.

The invention has been described in detail with reference to the isomerization of butane in the presence of a supported aluminum chloride catalyst. It is to be understood, however, that the invention is in no wise limited in its applicability to this particular conversion operation and may be applied with advantage to the execution of many catalytic conversions effected in the presence of many types of catalytic materials. Catalytic conversions tropical of the many which can be effected with improved efficiency with the aid of the process and apparatus of the invention comprise the isomerization of saturated hydrocarbons in the presence of catalysts comprising a halide of aluminum, molybdenum sulfide or the like; hydrogenation of organic compounds in the presence of catalysts comprising supported hydrogenating metal catalysts; dehydrogenation of hydrocarbons in the presence of metal oxide dehydrogenation catalysts; alkylation and/or polymerization of hydrocarbons in the presence of solid phosphoric acid catalysts; aromatization of hydrocarbons in the presence of catalysts comprising oxides and/or sulfides of heavy metals such as a aluminum, chromium, molybdenum, molybdic and tungstic acid; the isomerization of olefines with catalysts comprising base-exchange catalysts and/or acid adsorbents; catalytic cracking of hydrocarbons in the presence of synthetic hydrosilicate catalysts; oxidation of saturated and/or unsaturated hydrocarbons with silver catalysts; desulfurization of hydrocarbon fractions in the presence of catalysts comprising metals such as iron, copper, etc.; and the like.

I claim as my invention:

1. In an isomerization process wherein butane is passed under isomerizing conditions through an elongated reaction zone containing a bed of catalytic material consisting of adsorbent alumina impregnated with anhydrous aluminum chloride followed by an adjoining bed of adsorbent alumina, the method of prolonging the useful life of said catalyst material which comprises the steps of intermittently withdrawing from the reaction zone a part of the catalytic material farthest removed from the bed of adsorbent alumina said catalytic material being substantially spent, treating said withdrawn part of the catalytic material outside of the reaction zone to recover and regenerate the adsorbent alumina contained therein, passing anhydrous aluminum chloride vapors through the remaining partially spent catalytic material and the adsorbent alumina in situ to simultaneously increase the catalytic activity of said partially spent catalytic material and render the adsorbent alumina catalytically active by impregnation, and returning the above-said regenerated adsorbent alumina to the outlet end of the reaction zone.

2. In a process for the isomerization of butane wherein butane is passed under isomerizing conditions through an elongated reaction zone containing a bed of catalytic material consisting of adsorbent alumina impregnated with anhydrous aluminum chloride followed by an adjoining bed of adsorbent alumina to remove catalyst from the reaction mixture in the outlet end of the reaction zone, the method of prolonging the useful life of said catalyst material which comprises the steps of intermittently withdrawing and regenerating a substantially spent part of the catalytic material outside of the reaction zone, passing anhydrous aluminum chloride vapors through the remaining partially spent catalytic material in situ, and returning the above-said regenerated catalytic material to the reaction zone.

3. A process in accordance with claim 2, wherein the adsorbent alumina which has functioned to remove the catalyst from the reaction mixture is placed in the inlet section of the reaction zone prior to a subsequent isomerization phase of the process.

4. In a catalytic hydrocarbon conversion process wherein hydrocarbons are passed under conversion conditions through an elongated reaction zone containing a bed of catalytic material consisting of an adsorbent material impregnated with a volatile catalyst followed by an adjoining bed of adsorbent material, the method of prolonging the useful life of said catalyst material which comprises the steps of intermittently withdrawing from the reaction zone a part of the catalytic material farthest removed from the bed of adsorbent material said catalytic material being substantially spent, treating said withdrawn part of the catalytic material outside of the reaction zone to recover and regenerate the adsorbent material contained therein, passing vapors of the volatile catalyst through the remaining partially spent catalytic material and the adsorbent material in situ to simultaneously increase by re-impregnation the catalytic activity of said partially spent material and render catalytically active by impregnation the adsorbent material, and returning the regenerated adsorbent material to the outlet end of the reaction zone.

5. In a process for the isomerization of butane wherein butane is passed under isomerizing conditions through an elongated reaction zone containing catalytic material comprising adsorbent alumina impregnated with anhydrous aluminum chloride, the method of prolonging the useful life of said catalyst material which comprises the steps of intermittently withdrawing a part of the catalytic material from the inlet end of the reaction zone said satalytic material being substantially spent, regenerating said withdrawn part of the catalytic material outside of the reaction zone, passing anhydrous aluminum chloride vapors through the remaining partially spent catalytic material in situ, and returning the regenerated catalytic material to the outlet end of the reaction zone.

6. In a process for the isomerization of butane wherein butane is passed under isomerizing conditions through an elongated reaction zone containing a plurality of cartridges of catalytic material removably positioned one above the other within the reaction zone, said catalytic material consisting of adsorbent alumina impregnated with anhydrous aluminum chloride, the method of prolonging the useful life of said catalyst material which comprises the steps of intermittently removing from the reaction zone the cartridge of substantially spent catalytic material first contacted by the reactants, regenerating said cartridge of catalytic material outside of the reaction zone, passing aluminum chloride vapors through the remaining cartridges of partially spent catalytic material in situ, and returning the regenerated cartridge of catalytic material to the section of the reaction zone last traversed by the butane.

7. In a process for the isomerization of butane wherein butane is passed under isomerizing conditions through an elongated reaction zone containing catalytic material comprising adsorbent alumina impregnated with anhydrous aluminum chloride, the method of prolonging the useful life of said catalyst material which comprises the steps of intermittently removing and regenerating a part of the catalytic material outside of the reaction zone said catalytic material being substantially spent, and passing aluminum chloride vapors through the remaining partially spent catalytic material in situ and returning the regenerated material to the outlet end of the reaction zone.

8. In a catalytic hydrocarbon conversion process wherein hydrocarbons are passed at conversion conditions through an elongated reaction zone of restricted cross-sectional area containing a plurality of cartridges of catalytic material removably positioned one above the other within the reaction zone, said catalytic material consisting of an adsorbent support impregnated with a catalyst having a relatively high vapor pressure, the method of prolonging the useful life of said catalyst material which comprises the steps of intermittently removing from the reaction zone the cartridge of substantially spent catalytic material first contacted by the reactants, regenerating said cartridge of catalytic material outside of the reaction zone, passing vapors of the catalyst having a relatively high vapor pressure through the remaining cartridges of partially spent catalytic material in situ, and returning the regenerated cartridge of catalytic material to the section of the reaction zone last traversed by the hydrocarbons.

9. In a catalytic hydrocarbon conversion process wherein hydrocarbons are passed under conversion conditions through an elongated reaction zone containing catalytic material comprising an adsorbent material impregnated with a volatile catalyst, the method of prolonging the useful life of said catalyst material which comprises the steps of intermittently removing a part of the catalytic material from the inlet end of the reaction zone, said catalytic material being substantially spent, regenerating said part of the catalytic material outside of the reaction zone, passing vapors of the volatile catalyst through the remainder of the partially spent catalytic material in situ, and returning the regenerated catalytic material to the outlet end of the reaction zone.

FRANK M. McMILLAN.